(12) United States Patent
Syed et al.

(10) Patent No.: US 8,880,290 B2
(45) Date of Patent: Nov. 4, 2014

(54) DRIVING BEHAVIOR FEEDBACK INTERFACE

(75) Inventors: Fazal Urrahman Syed, Canton, MI (US); Dimitar Petrov Filev, Novi, MI (US); Venkatapathi Raju Nallapa, Dearborn, MI (US); Paul Stephen Bryan, Belleville, MI (US); Ryan J. Skaff, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 155 days.

(21) Appl. No.: 13/443,236

(22) Filed: Apr. 10, 2012

(65) Prior Publication Data
US 2013/0173111 A1    Jul. 4, 2013

Related U.S. Application Data

(60) Provisional application No. 61/581,940, filed on Dec. 30, 2011.

(51) Int. Cl.
*G06F 7/00*    (2006.01)
*G06F 11/32*    (2006.01)

(52) U.S. Cl.
USPC .................... 701/36; 701/1; 701/70; 701/738

(58) Field of Classification Search
CPC ......................................................... G06F 7/00
USPC .......................................... 701/36, 1, 70, 738
See application file for complete search history.

(56) References Cited

U.S. PATENT DOCUMENTS

| | | | |
|---|---|---|---|
| 6,092,021 A | 7/2000 | Ehlbeck et al. | |
| 6,167,357 A * | 12/2000 | Zhu et al. | ...................... 702/175 |
| 7,454,962 B2 | 11/2008 | Nishiyama et al. | |
| 7,603,228 B2 | 10/2009 | Coughlin | |
| 7,765,058 B2 | 7/2010 | Doering | |
| 7,798,578 B2 | 9/2010 | Lewis et al. | |
| 8,255,122 B2 | 8/2012 | Tanaka | |
| 2007/0143002 A1 | 6/2007 | Crowell et al. | |

(Continued)

FOREIGN PATENT DOCUMENTS

| | | |
|---|---|---|
| EP | 2036777 B1 | 3/2010 |
| EP | 2332770 A1 | 6/2011 |
| EP | 2332784 A1 | 6/2011 |

OTHER PUBLICATIONS

Ryuichi Kamaga et al., Development of Plug-in Hybrid Control ECU, Fujitsu Ten Tech. J. No. 35, 2010, pp. 10-16.

(Continued)

*Primary Examiner* — Fadey Jabr
*Assistant Examiner* — Yazan A Soofi
(74) *Attorney, Agent, or Firm* — David B. Kelley; Brooks Kushman P.C.

(57) ABSTRACT

One or more embodiments of the present application may provide a system and method for monitoring driver inputs and vehicle parameters, assessing a driver's acceleration behavior, and providing short-term and/or long-term feedback to the driver relating to the driver's acceleration behavior. The acceleration behavior feedback can be used to coach future driving acceleration behavior that may translate into better long-term driving habits, which in turn may lead to improvements in fuel economy or vehicle range. Moreover, the acceleration behavior feedback can be adapted to a driver based upon how responsive the driver is to the feedback.

13 Claims, 10 Drawing Sheets

(56) References Cited

U.S. PATENT DOCUMENTS

| | | |
|---|---|---|
| 2009/0043467 A1 | 2/2009 | Filev et al. |
| 2009/0105897 A1 | 4/2009 | Breslau et al. |
| 2009/0326753 A1* | 12/2009 | Chen et al. ............. 701/29 |
| 2010/0152949 A1 | 6/2010 | Nunan et al. |
| 2010/0211259 A1 | 8/2010 | McClellan |
| 2011/0106334 A1 | 5/2011 | Filev et al. |
| 2011/0153175 A1 | 6/2011 | Zhang et al. |
| 2011/0257828 A1 | 10/2011 | Levy et al. |
| 2012/0089423 A1* | 4/2012 | Tamir et al. ............. 705/4 |
| 2012/0239462 A1* | 9/2012 | Pursell et al. ............. 705/7.38 |
| 2012/0283893 A1 | 11/2012 | Lee et al. |
| 2013/0013348 A1 | 1/2013 | Ling et al. |
| 2013/0110310 A1* | 5/2013 | Young ............. 701/1 |

OTHER PUBLICATIONS

Office Action dated Aug. 30, 2013 for U.S. Appl. No. 13/443,247, filed Apr. 10, 2012, pp. 1-9.

Office Action dated Sep. 10, 2013 for U.S. Appl. No. 13/443,419, filed Apr. 10, 2012, pp. 1-11.

* cited by examiner

| | Antecedents (for μ value) | | | Consequents (for h value) | | | |
|---|---|---|---|---|---|---|---|
| Rule (i) | If Accel Pedal Change $(x_1)$ Is | If Adapted Normalized Accel $(x_2)$ Is | If Normalized Total Power $(x_3)$ Is | Then Advised Change in Score $(y_1)$ Is | Then MAX Score Offset $(y_2)$ Is | Then MIN Score Offset $(y_3)$ Is | Comments |
| 1 | Low | Low | Low | High | High | Zero | Steady state condition where driver acceleration performance is efficient. |
| 2 | Low | Low | High | Low | Low | Zero | Steady state condition where total power consumption is high, so anticipate for and provide advice to improve driving. |
| 3 | Low | High | Low | Low | High | Zero | Steady state condition where driver is driving efficiently, but conditions exist that may cause deterioration in economy/range. |
| 4 | Low | High | High | -Low | Low | Zero | Steady state condition where vehicle acceleration is high and total power consumption is high, so indicate to driver to improve driving. |
| 5 | High | Low | Low | -Low | High | One | Transient predictive condition where current vehicle conditions are OK, but due to the faster driver pedal response, use predictive actions to prepare for any upcoming inefficiency. |
| 6 | High | Low | High | -Low | Low | One | Transient predictive condition where current vehicle conditions are not OK, and quickly prepare to indicate to driver to decrease driver power demand after transient event is over. |
| 7 | High | High | Low | High | Low | One | Transient opportunistic condition where current vehicle conditions are OK but may soon deteriorate, so slowly prepare to indicate to driver to decrease driver power demand after transient event is over. |
| 8 | High | High | High | -High | High | High | Transient condition where current vehicle conditions are not OK, so quickly prepare to indicate to driver to decrease driver power demand. |

Fig. 6

DRIVING BEHAVIOR FEEDBACK INTERFACE

CROSS-REFERENCE TO RELATED APPLICATIONS

This application claims the benefit of U.S. provisional Application No. 61/581,940. filed Dec. 30, 2011, the disclosure of which is incorporated in its entirety by reference herein.

TECHNICAL FIELD

One or more embodiments of the present application relate to a system and method for conveying feedback to a driver on the driver's acceleration behavior via a user interface.

BACKGROUND

Vehicles include a number of interfaces, such as gauges, indicators, and various displays to convey information to the user regarding the vehicle's operation and its surroundings. With the advent of new technologies, including technologies found in conventional vehicles as well as in hybrid electric vehicles (HEVs), plug-in hybrid electric vehicle (PHEVs) and battery electric vehicles (BEVs), these interfaces have become more sophisticated. For example, many HEVs incorporate gauges that attempt to provide the driver with information on the various hybrid driving states. Some gauges will indicate to the driver when the vehicle is being propelled by the engine alone, the motor alone, or a combination of the two. Similarly, a display may indicate when the motor is operating as a generator, and is recharging an energy storage device, such as a battery. Regardless of the vehicle type, fuel economy or range of a vehicle still remains an important metric to most vehicle drivers.

In real world driving conditions, driver behavior remains the primary factor affecting fuel economy or range of a vehicle. It is known that some drivers may not be able to achieve desired fuel economy or range, in part because of driving habits. Although it is clear that driving behavior affects the fuel economy or range of a vehicle, it is often unclear how one should drive by taking powertrain and other environmental factors into account in order to improve fuel economy or range. In many cases, drivers are willing to modify their behavior, but are unable to translate recommended techniques into real changes in their driving habits.

SUMMARY

According to one or more embodiments of the present application, a display control system and method for coaching driving acceleration behavior is provided. The control system may include a controller and an interface in communication with the controller. The controller may be configured to receive input indicative of at least vehicle acceleration and powertrain output power. The controller may be further configured to output at least one acceleration score based upon the input. The interface may be configured to display an acceleration feedback indicator indicative of the at least one acceleration score.

The interface may include an acceleration feedback gauge for displaying the acceleration feedback indicator. The interface may be configured to adjust the acceleration feedback indicator within the acceleration feedback gauge based on the at least one acceleration score. The at least one acceleration score indicated by the acceleration feedback indicator may include one of a long-term acceleration score and an instantaneous acceleration score. Moreover, the interface may be further configured to adjust a color of at least a portion of the acceleration feedback gauge based on the other of the long-term acceleration score and the instantaneous acceleration score.

According to one or more embodiments, the input may be further indicative of an accelerator pedal position change. The controller may calculate the instantaneous acceleration score based upon the vehicle acceleration, the powertrain output power and the accelerator pedal position change. In this regard, the controller may normalize one or more of the vehicle acceleration, the powertrain output power and the accelerator pedal position change based upon vehicle speed prior to calculating the instantaneous acceleration score. Moreover, the controller may calculate an adapted acceleration value prior to calculating the instantaneous acceleration score. The adapted acceleration value may be based on the vehicle acceleration and the long-term acceleration score. For instance, the adapted acceleration value may be calculated by multiplying a normalized acceleration value by the long-term acceleration score.

According to one or more embodiments, the instantaneous acceleration score may be calculated using a fuzzy logic algorithm. Furthermore, the long-term acceleration score may be based at least in part upon the instantaneous acceleration score, a previous long-term acceleration score, and a forgetting factor for weighting the instantaneous acceleration score and the previous long-term acceleration score. A value associated with the forgetting factor may be based on a comparison of the instantaneous acceleration score to a function of the long-term acceleration score.

BRIEF DESCRIPTION OF THE DRAWINGS

FIG. 6 is a table illustrating an exemplary set of fuzzy rules in accordance with one or more embodiments of the present application;

DETAILED DESCRIPTION

Figure 1:
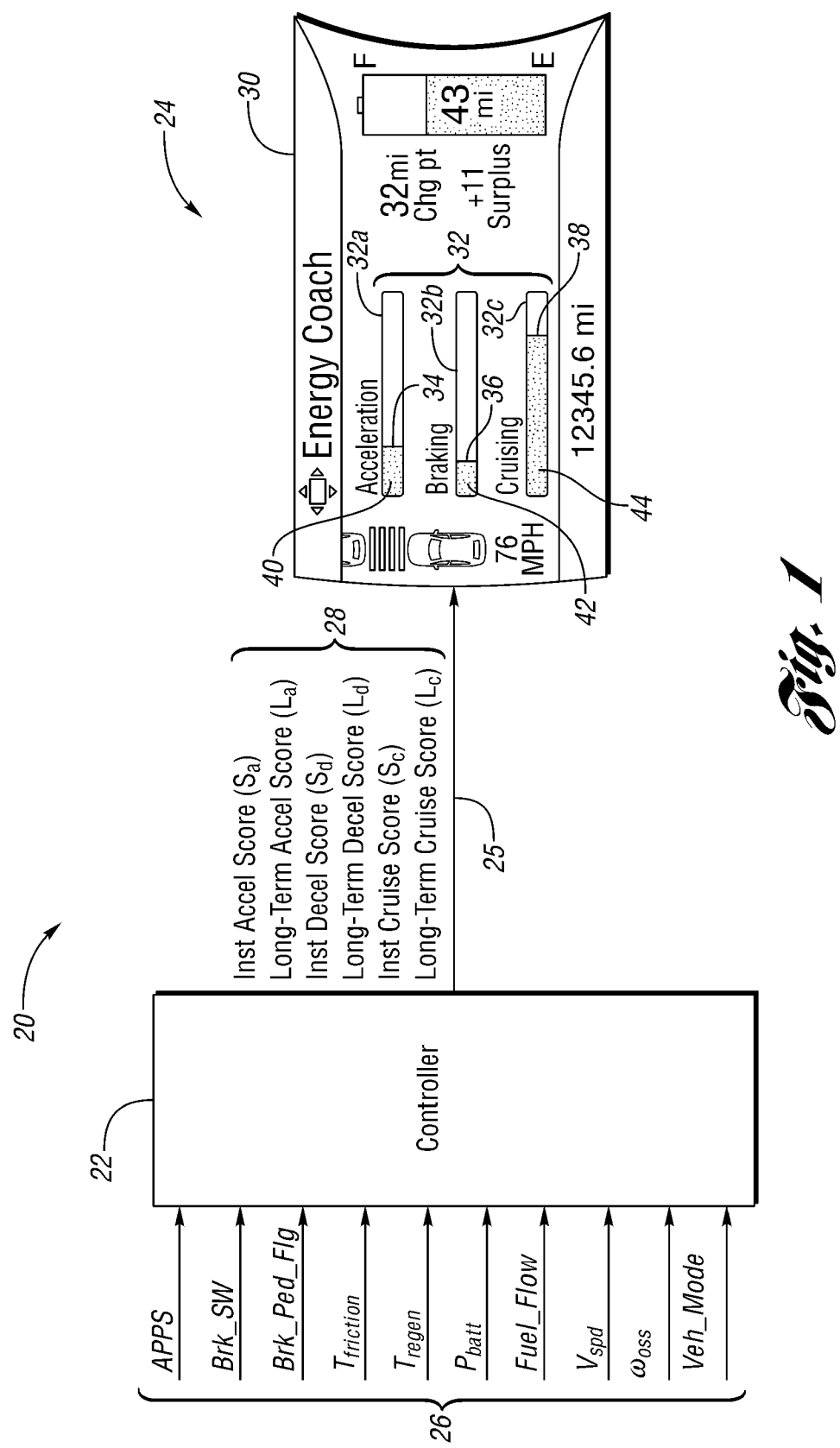
FIG. 1 is a high-level, functional diagram of a vehicle control system for coaching driving behavior in accordance with one or more embodiments of the present application.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

One of the main driver factors than can affect the fuel efficiency or range of a vehicle is the driving acceleration behavior as dictated by the driver's accelerator pedal maneuver. Many drivers are often uncertain how they should drive in order to improve fuel economy or range by taking powertrain and other environmental factors into account. Feedback to drivers on their driving acceleration behavior can impact or improve their future actions to increase fuel economy or range with minimal, if any, effect on the drivability of the vehicle. Real-time driving acceleration behavior feedback can translate into better long-term driving habits.

One or more embodiments of the present application may provide a system and method for monitoring driver inputs and vehicle parameters, assessing a driver's acceleration behavior, and providing feedback to the driver relating to the acceleration behavior. The driving acceleration behavior feedback can be used to coach the driver's future driving acceleration behavior. The driving acceleration behavior coaching may ultimately lead to improvements in the vehicle's power efficiency when the current driving acceleration behavior negatively affects or reduces the power efficiency of the vehicle.

The system can provide relatively short-term feedback or advice relating to a driver's driving acceleration behavior. Moreover, the system may monitor the driver's acceptance or rejection of the short-term feedback in order to learn the driver's long-term intentions for using the feedback to modify his or her driving acceleration behavior. Further, the system may provide a long-term score relating to the driver's driving acceleration behavior that may be based, at least in part, upon the driver's acceptance or rejection of the driving acceleration behavior feedback. In this manner, the system can adapt to the driver's long-term intentions regarding use of the acceleration behavior coaching to modify driving habits and can provide corresponding feedback that may tend to improve the driver's acceleration behavior gradually over time. According to one or more embodiments of the present application, the long-term score relating to the driver's acceleration behavior may be used to modify the system's vehicle acceleration input, which may be used in generating the short-term feedback when the accelerator pedal position, the vehicle speed, and the acceleration are each above certain thresholds.

Referring now to the drawings, FIG. 1 depicts a high-level, functional diagram of a control system 20 for a vehicle (not shown) for coaching driving behavior in accordance with one or more embodiments of the present application. The control system 20 may include a controller 22 and a user interface 24 that are in communication with each other. Although it is shown as a single controller, the controller 22 may include multiple controllers that may be used to control multiple vehicle systems. For example, the controller 22 may be a vehicle system controller/powertrain control module (VSC/PCM). In this regard, the PCM portion of the VSC/PCM may be software embedded within the VSC/PCM, or it can be a separate hardware device. The controller 22 generally includes any number of microprocessors, ASICs, ICs, memory (e.g., FLASH, ROM, RAM, EPROM and/or EEPROM) and software code to co-act with one another to perform a series of operations. The controller 22 may communicate with other controllers (e.g., a battery energy control module, transmission control module, etc.) and the user interface 24 over a hardline vehicle connection, such as a BUS 25, using a common bus protocol (e.g., CAN), or may communicate wirelessly with other vehicle devices using a wireless transceiver (not shown).

The controller 22 may receive input signals 26 and may generate one or more instantaneous and/or long-term driving behavior feedback signals 28 in response to the input signals 26. The controller 22 may transmit this information to the user interface 24, which in turn conveys the information to the driver. The driver may then use the driving behavior feedback to improve driving habits, such as those relating to acceleration, deceleration and cruising.

The user interface 24 may include at least one display 30 and associated circuitry, including hardware and/or software, necessary to communicate with the controller 22 and operate the display. The display 30 may be generally used to convey relevant vehicle content to a driver of the vehicle including, for example, driving behavior information or other information relating to the operation of the vehicle.

The display 30 may be disposed within a dashboard (not shown) of the vehicle, such as in an instrument panel or center console area. Moreover, the display 30 may be part of another user interface system, such as a navigation system, or may be part of a dedicated information display system. The display 30 may be a liquid crystal display (LCD), a plasma display, an organic light emitting display (OLED), or any other suitable display. The display 30 may include a touch screen for receiving driver input associated with selected areas of the display. The user interface 24 or display 30 may also include one or more buttons (not shown), including hard keys or soft keys, for effectuating driver input.

The driving behavior feedback signals 28 generated by the controller 22 may correspond to a score or other relative metric that may be used to evaluate aspects of a driver's driving behavior, such as acceleration behavior, deceleration (braking) behavior and cruising speed behavior. According to one or more embodiments, the driving behavior feedback signals 28 may include one or more of the following driving behavior scores: an instantaneous acceleration score ($S_a$), a long-term acceleration score ($L_a$), an instantaneous deceleration score ($S_d$), a long-term deceleration score ($L_d$), an instantaneous cruising speed score ($S_c$), and a long-term cruising speed score ($L_c$).

The display 30 may include one or more driving behavior feedback gauges 32 for conveying the various driving behavior feedback scores. In particular, the display 30 may include an acceleration feedback gauge 32a associated with the instantaneous acceleration score ($S_a$) and/or the long-term acceleration score ($L_a$). The display 30 may further include a deceleration feedback gauge 32b associated with the instantaneous deceleration score ($S_d$) and/or the long-term deceleration score ($L_d$). Furthermore, the display 30 may include a cruising speed feedback gauge 32c associated with the instantaneous cruising speed score ($S_c$) and/or the long-term cruising speed score ($L_c$). As shown in FIG. 1, each driving behavior feedback gauge 32 may be a bar gauge including at least one feedback indicator corresponding to at least one of the driving behavior feedback signals 28. For instance, the acceleration feedback gauge 32a may include an acceleration feedback indicator 34 corresponding to at least one of the instantaneous acceleration score ($S_a$) and the long-term acceleration score ($L_a$). Similarly, the deceleration feedback gauge 32b may include a deceleration feedback indicator 36 corresponding to at least one of the instantaneous deceleration score ($S_d$) and the long-term deceleration score ($L_d$). The cruising speed feedback gauge 32c may include a cruising speed feedback indicator 38 corresponding to at least one of the instantaneous cruising speed score ($S_c$) and the long-term cruising speed score ($L_c$). Each feedback indicator may define a corresponding bar segment illuminated or otherwise displayed by the display 30. Accordingly, the driving behavior score corresponding to each feedback indicator may define the length of its associated bar segment. For example, the acceleration feedback indicator 34 may define an acceleration bar segment 40 on the acceleration feedback gauge 32a, the deceleration feedback indicator 36 may define a deceleration bar segment 42 on the deceleration feedback gauge 32b, and the cruising speed feedback indicator 38 may define a cruising speed bar segment 44 on the cruising speed feedback gauge 32c. Although each driving behavior feedback gauge 32 may be implemented using a bar gauge or similar graphic, various alternate types of gauges and/or indicators may also be employed to convey the driving behavior scores. Some non-limiting examples may include numerical indicators, needle gauges, and the like.

One or more embodiments of the present application may be implemented in all types of vehicles, including vehicles having different powertrain configurations. For example, one or more embodiments may be implemented in hybrid electric vehicles (HEVs), plug-in hybrid electric vehicles (PHEVs), battery electric vehicles (BEVs), or conventional vehicles, such as those powered solely by an internal combustion engine. HEVs may refer to vehicles powered by an engine and/or one or more electric motors. BEVs may refer to all-electric vehicles propelled by one or more electric motors without assistance from an internal combustion engine. PHEVs may refer to hybrid electric vehicles primarily powered by one or more electric motors. PHEVs and BEVs may be connected to an external power supply for charging a vehicle battery that supplies electrical power to the motors.

In order to provide one or more of the driving behavior feedback signals 28 referenced above, one or more of the input signals 26 received by the controller 22 may be generally indicative of vehicle speed ($V_{spd}$), actual vehicle acceleration ($A_{actual}$), and/or actual vehicle deceleration ($D_{actual}$). In addition, one or more of the input signals 26 may be generally indicative of total powertrain output power ($P_{total}$), accelerator pedal position change ($\Delta Acc\_Ped$) and/or braking percentage (Pct_Brk). The input signals 26 received by the controller 22 may be used in one or more algorithms contained within, or otherwise executed by, the controller 22 for determining input values such as vehicle acceleration ($A_{actual}$), deceleration ($D_{actual}$), total powertrain output power ($P_{total}$), accelerator pedal position change ($\Delta Acc\_Ped$) and/or braking percentage (Pct_Brk). Although generally described as inputs received directly by the controller 22, one or more of the input signals 26 may be merely indicative of inputs generally used in controller algorithms for generating the driving behavior feedback. To this end, exemplary input signals may include an accelerator pedal position signal (APPS), a brake switch signal (Brk_SW) and/or brake pedal flag signal (Brk_Ped_Flg), friction braking torque ($T_{friction}$), regenerative braking torque ($T_{regen}$), high-voltage (HV) battery power ($P_{batt}$), fuel flow rate (Fuel_Flow), vehicle speed ($V_{spd}$) or output shaft speed ($\omega_{oss}$), vehicle mode (Veh_Mode), and the like.

The inputs may be received directly as input signals from individual systems or sensors (not shown), or indirectly as input data over the CAN bus 25. The input signals 26 received by the controller 22 may be dependent on the powertrain technology employed in a particular vehicle. For instance, in conventional vehicle applications, the input signals relating to the HV battery power ($P_{batt}$) or regenerative braking torque ($T_{regen}$), for example, may not be present or applicable in generating the driving behavior feedback signals 28. Similarly, in BEV applications, an input signal corresponding to the fuel flow rate (Fuel_Flow) would not be applicable.

The controller 22 may determine the actual vehicle acceleration ($A_{actual}$) and deceleration ($D_{actual}$) from the actual vehicle speed ($V_{spd}$) or output shaft speed ($\omega_{oss}$). The controller 22 may determine the total powertrain output power ($P_{total}$) a number of ways depending upon the powertrain configuration. For instance, the total powertrain output power ($P_{total}$) in HEV and PHEV applications may be the sum of the battery power ($P_{batt}$) from a high voltage battery and fuel power ($P_{fuel}$) as set forth below:

$$P_{total} = P_{batt} + P_{fuel} \quad \text{Eq. 1}$$

The fuel power ($P_{fuel}$) may be calculated using the value from the fuel flow rate (Fuel_Flow) and a fuel density (Fuel_Density) according to Eq. 2 set forth below:

$$P_{fuel} = \text{Fuel\_Flow} \times \text{Fuel\_Density} \quad \text{Eq. 2}$$

In BEV applications, however, the total powertrain output power ($P_{total}$) may be based solely on the battery power ($P_{batt}$):

$$P_{total} = P_{batt} \quad \text{Eq. 3}$$

In conventional powertrain applications, the total powertrain output power ($P_{total}$), may be based solely on the fuel power ($P_{fuel}$):

$$P_{total} = P_{fuel} \quad \text{Eq. 4}$$

The controller 22 may determine the accelerator pedal position change ($\Delta Acc\_Ped$) from the accelerator pedal position signal (APPS), which may represent a driver request for wheel torque/power. Therefore, the accelerator pedal position change ($\Delta Acc\_Ped$) may be indicative of the driver's accelerator pedal response.

Figure 2:
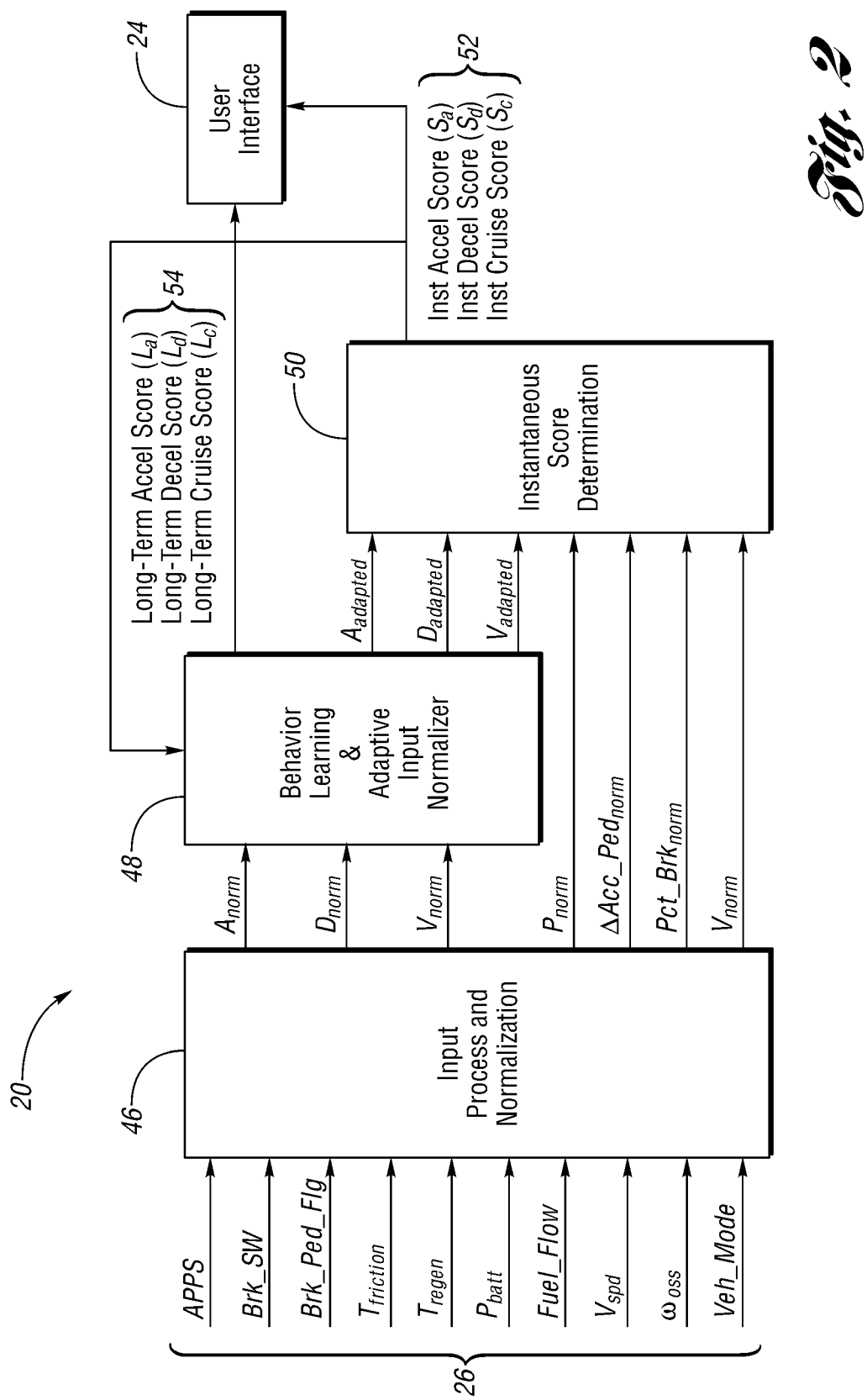
FIG. 2 is an exemplary, functional block diagram of the control system in greater detail.

FIG. 2 is an exemplary, functional block diagram of the control system 20 in greater detail. As seen therein, the controller 22 may include a plurality of interrelated algorithms, represented as distinct blocks, for generating the driving behavior feedback signals 28. Although several of the interrelated algorithms have been divided up schematically in FIG. 2 for illustrative purposes, they me be combined into one larger algorithm for generating the driving behavior feedback signals 28 transmitted to the user interface 24. As shown in FIG. 2, the input signals 26 described with respect to FIG. 1 may be generally received at an input process and normalization block 46. Within the input process and normalization block 46, one or more of the input signals 26 may be processed to obtain the values for vehicle acceleration ($A_{actual}$), deceleration ($D_{actual}$), total powertrain output power ($P_{total}$), accelerator pedal position change ($\Delta Acc\_Ped$), braking percentage (Pct_Brk) or the like, as described above. Moreover, the vehicle acceleration ($A_{actual}$) and deceleration ($D_{actual}$) may be modified as a function of vehicle speed ($V_{spd}$) to obtain a normalized acceleration value ($A_{norm}$) and a normalized deceleration value ($D_{norm}$), respectively.

The total powertrain output power ($P_{total}$) may also be modified as a function of vehicle speed ($V_{spd}$) to generate a normalized total powertrain output power value ($P_{norm}$). Similarly, the accelerator pedal position change ($\Delta Acc\_Ped$) may also be modified as a function of vehicle speed ($V_{spd}$) to obtain a normalized accelerator pedal position change value ($\Delta Acc\_Ped_{norm}$). In some instances, the vehicle speed ($V_{spd}$) itself may be normalized to obtain a normalized vehicle speed ($V_{norm}$).

Like the total powertrain output power, the controller 22 may determine braking percentage (Pct_Brk) differently based on the powertrain configuration. For HEVs, PHEVs, and BEVs, the braking percentage (Pct_Brk) may be based upon a ratio of regenerative braking torque ($T_{regen}$) to the sum of friction braking torque ($T_{friction}$) and regenerative braking torque ($T_{regen}$). For instance, the braking percentage (Pct_Brk) may be determined by a filtered unity minus the aforementioned ratio, as set forth in Eq. 5 below:

$$Pct\_Brk = 1 - \frac{T_{regen}}{T_{friction} + T_{regen}} \quad \text{Eq. 5}$$

In general, a relatively low braking percentage may indicate that braking is mostly done with regenerative braking. Conversely, a relatively high braking percentage may indicate that braking is mostly done with friction braking.

For conventional vehicles, the braking percentage (Pct_Brk) may be determined from one or more of the brake pedal signals (e.g., Brk_SW and/or Brk_Ped_Flg). As understood by one of ordinary skill in the art, the brake switch signal (Brk_SW) may be an input that indicates when the brake pedal is first being pressed. The brake pedal flag signal (Brk_Ped_Flg) may be a redundant brake pedal input that indicates when the brake pedal is being pressed beyond a point signaled by the brake switch signal (Brk_SW). In some applications, only one brake pedal signal may be available and, thus, the signals may be substituted for one another. According to one or more embodiments, the braking percentage (Pct_Brk) in conventional vehicles may be a slowly filtered weighted sum of the brake pedal switches. In general, if one of the brake pedal switches is active, the braking percentage may be relatively low; if two of the brake pedal switches are active, then the braking percentage may be relatively high. The braking percentage (Pct_Brk) may also be modified as a function of vehicle speed ($V_{spd}$) to obtain a normalized braking percentage value (Pct_Brk$_{norm}$).

The acceleration, deceleration, vehicle speed, total powertrain output power, accelerator pedal position change and braking percentage may be normalized with respect to vehicle speed because a vehicle may behave differently at lower speeds than it does at higher speeds. Moreover, the system may want to account for the vehicle speed when determining the driving behavior feedback signals 28. For instance, the system may want to deemphasize a driver's pedal response at low speeds. Accordingly, the controller 22 may calculate the normalized accelerator pedal position change ($\Delta Acc\_Ped_{norm}$) to adjust for vehicle speed. Also, the maximum total powertrain output power ($P_{max}$) may generally be lower at lower speeds and the maximum vehicle acceleration ($A_{max}$) may generally be higher at lower speeds. Normalization of these input values can allow for the system to take vehicle speed into account when providing driving behavior feedback.

The controller 22 may further include a behavior learning and adaptive input normalizer block 48 and an instantaneous score determination block 50. The normalized outputs of the input process and normalization block 46 may become inputs to the behavior learning and adaptive input normalizer block 48 and/or the instantaneous score determination block 50. At the behavior learning and adaptive input normalizer block 48, the controller 22 may monitor a driver's instantaneous driving behavior via one or more instantaneous driving behavior feedback signals 52 (e.g., the instantaneous acceleration score ($S_a$), the instantaneous deceleration score ($S_d$), or the instantaneous cruising speed score ($S_c$)) output by the instantaneous score determination block 50. The instantaneous driving behavior feedback signals 52 may also be transmitted to the user interface 24. The controller 22 may evaluate the driver's general acceptance or rejection of short-term driving behavior feedback based on the instantaneous driving behavior feedback signals 52. In this manner, the controller 22 may learn or adapt to the driver's long-term driving behavior intentions based upon whether the driver is responsive to the feedback or generally ignores the feedback.

Moreover, the controller 22 may generate one or more long-term driving behavior feedback signals 54 (e.g., the long-term acceleration score ($L_a$), the long-term deceleration score ($L_d$), or the long-term cruising speed score ($L_c$)), which may be transmitted to the user interface 24. Additionally, the long-term driving behavior feedback signals 54 may be used to further modify the normalized inputs for acceleration, deceleration and vehicle speed. For example, in one or more embodiments, the controller 22 may adapt the normalized acceleration input ($A_{norm}$) based on whether the driver is responsive to driving acceleration behavior feedback. In this regard, the normalized acceleration ($A_{norm}$) may be multiplied by the long-term acceleration score ($L_a$) at the behavior learning and adaptive input normalizer block 48 to generate an adapted normalized acceleration value ($A_{adapted}$). The controller 22 may also modify the normalized inputs for deceleration and/or vehicle speed in a similar manner at the behavior learning and adaptive input normalizer block 48 to generate an adapted normalized deceleration ($D_{adapted}$) and an adapted normalized vehicle speed ($V_{adapted}$), respectively.

In general, the system may convey short-term and/or long-term driving behavior feedback during particular driving behavior events. For instance, the system may convey driving acceleration behavior feedback when the controller 22 determines that a qualifying acceleration event is occurring or has just occurred. According to one or more embodiments, the controller 22 may detect the occurrence of an acceleration event when accelerator pedal position is above a pedal position threshold, vehicle speed is above a speed threshold, and vehicle acceleration is above an acceleration threshold. The system may convey braking deceleration behavior feedback when the controller 22 determines that a qualifying deceleration (braking) event is occurring or has just occurred. According to one or more embodiments, the controller 22 may detect the occurrence of a deceleration event when the braking percentage is above a braking percentage threshold, vehicle speed is above a speed threshold, and vehicle deceleration is above a deceleration threshold. The system may convey cruising speed behavior feedback when the controller 22 determines that a cruising event is occurring. The controller 22 may detect the occurrence of a cruising event when no acceleration or deceleration events are occurring and the vehicle speed is above a minimum speed threshold. According to one or more embodiments, the controller 22 may convey cruising speed behavior feedback when the vehicle acceleration is below an acceleration threshold and the vehicle deceleration is below a deceleration threshold. The long-term driving behavior feedback signals 54 may be used to further modify or adapt the normalized inputs for acceleration, deceleration and vehicle speed, as described above, when an acceleration event, a deceleration event, or a cruising event is detected.

The adapted normalized acceleration ($A_{adapted}$) can be used in calculating future instantaneous acceleration scores ($S_a$). To this end, the adapted normalized acceleration ($A_{adapted}$) may be received as an input to the instantaneous score determination block 50. Similarly, the adapted normalized deceleration ($D_{adapted}$) and adapted normalized vehicle speed ($V_{adapted}$) can be used in calculating future instantaneous deceleration scores ($S_d$) and instantaneous cruising speed scores ($S_c$), respectively. Accordingly, the adapted normalized deceleration ($D_{adapted}$) and adapted normalized vehicle speed ($V_{adapted}$) may also be received as inputs to the instantaneous score determination block 50. As shown, the instantaneous score determination block 50 may also receive additional inputs that may be used to calculate the instantaneous driving behavior scores. For example, the normalized total powertrain output power ($P_{norm}$), the normalized accelerator pedal position change ($\Delta Acc\_Ped_{norm}$), the normalized braking percentage ($Pct\_Brk_{norm}$), and the normalized vehicle speed ($V_{norm}$) may be inputs to the instantaneous score determination block 50.

According to one or more embodiments of the present application, the instantaneous score determination block 50 may include a fuzzy logic controller and/or algorithm for generating one or more of the instantaneous driving behavior feedback signals 52. As previously described, the instantaneous driving behavior feedback signals 52 may be received at the behavior learning and adaptive input normalizer block 48 in order to evaluate the driver's general acceptance or rejection of the driving behavior feedback and provide long-term driving behavior feedback signals 54 to the user interface 24. In one or more embodiments, the instantaneous driving behavior feedback signals 52 may also be transmitted to the user interface 24 for display purposes along with the long-term driving behavior feedback signals 54.

Figure 3:
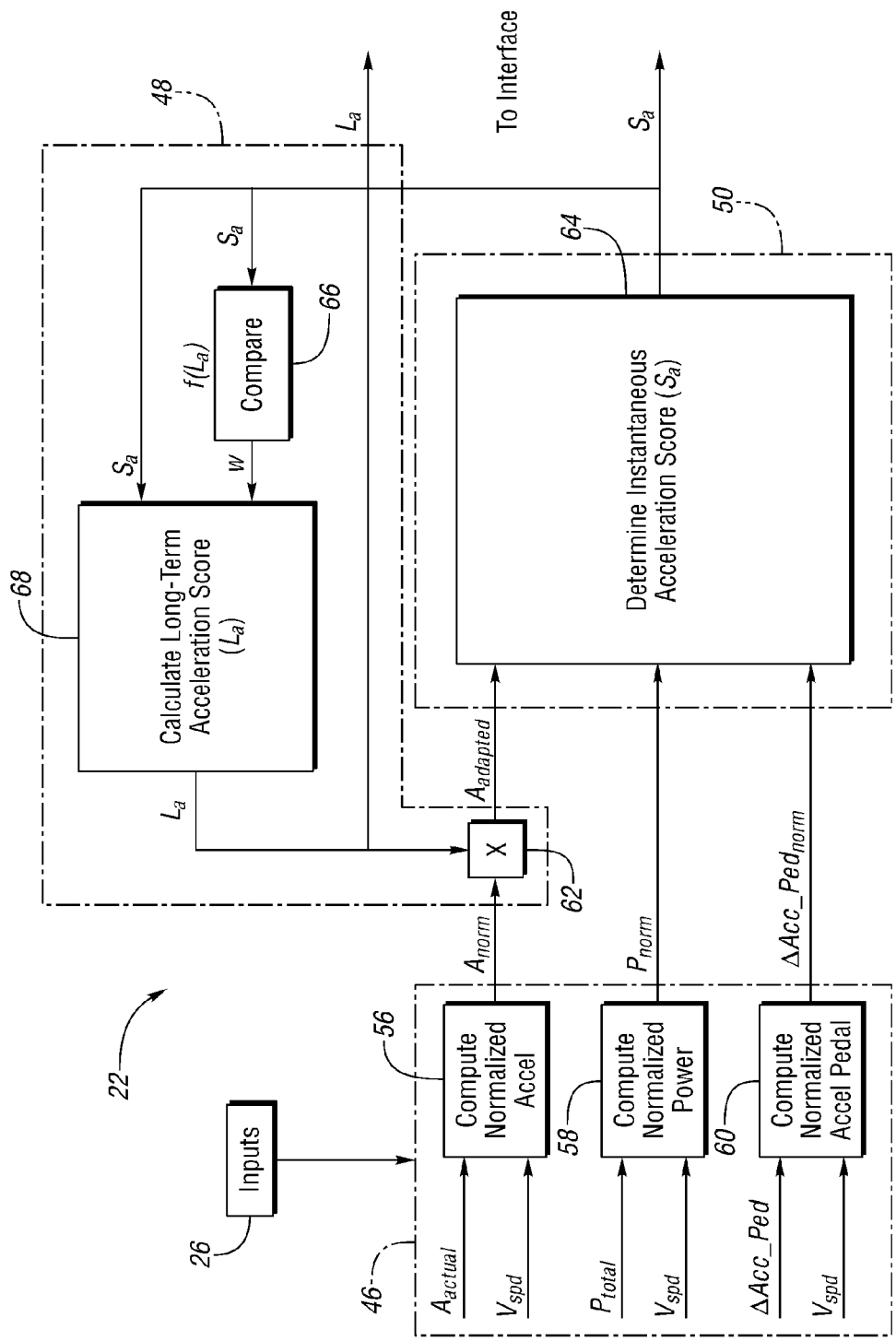
FIG. 3 is a simplified, schematic block diagram of the controller and related algorithms generally described in FIG. 2 for use in coaching driving acceleration behavior.

FIG. 3 illustrates a simplified, schematic block diagram of the controller algorithms generally described in FIG. 2 for use in coaching acceleration behavior. As shown, the controller 22 may generally include the input process and normalization block 46, the behavior learning and adaptive input normalizer block 48, and the instantaneous score determination block 50. At the input process and normalization block 46, the controller 22 may receive one or more of the input signals 26. As previously described, the one or more input signals 26 may be indicative of the vehicle acceleration ($A_{actual}$), total powertrain output power ($P_{total}$), accelerator pedal position change ($\Delta Acc\_Ped$), and vehicle speed ($V_{spd}$). Moreover, the vehicle acceleration, total powertrain output power, and accelerator pedal position change may each be normalized as a function of the vehicle speed. In this regard, the controller 22 may compute the normalized acceleration ($A_{norm}$) at block 56 in response to the acceleration ($A_{actual}$) and vehicle speed ($V_{spd}$) inputs. In order to compute the normalized acceleration ($A_{norm}$), the controller 22 may determine a maximum acceleration ($A_{max}$) value for the vehicle at the current vehicle speed. The maximum acceleration may be obtained in any number of ways as would be understood by one of ordinary skill in the art (e.g., a look-up table, an acceleration curve, etc.). Once the maximum acceleration ($A_{max}$) is determined, the normalized acceleration ($A_{norm}$) may be computed by dividing the actual acceleration ($A_{actual}$) by the maximum acceleration ($A_{max}$):

$$A_{norm} = \frac{A_{actual}}{A_{max}} \qquad \text{Eq. 6}$$

The controller 22 may compute the normalized total powertrain output power ($P_{norm}$) at block 58 in response to the total powertrain output power ($P_{total}$) and vehicle speed ($V_{spd}$) inputs. In order to compute the normalized total powertrain output power ($P_{norm}$), the controller 22 may determine a maximum powertrain output power ($P_{max}$) value for the vehicle at the current vehicle speed. The maximum powertrain output power may be obtained in any number of ways as would be understood by one of ordinary skill in the art (e.g., a look-up table, a power curve, etc.). Once the maximum powertrain output power ($P_{max}$) is determined, the normalized total powertrain output power ($P_{norm}$) may be computed by dividing the total powertrain output power ($P_{total}$) by the maximum powertrain output power ($P_{max}$):

$$P_{norm} = \frac{P_{total}}{P_{max}} \qquad \text{Eq. 7}$$

The controller 22 may compute the normalized accelerator pedal position change ($\Delta Acc\_Ped_{norm}$) at block 60 in response to the accelerator pedal position change ($\Delta Acc\_Ped$) and vehicle speed ($V_{spd}$) inputs. In order to compute the normalized accelerator pedal position change ($\Delta Acc\_Ped_{norm}$), the controller 22 may determine a maximum accelerator pedal position change ($\Delta Acc\_Ped_{max}$) value recognized by the control system 20 at the current vehicle speed. The maximum accelerator pedal position change may be obtained in any number of ways as would be understood by one of ordinary skill in the art (e.g., a look-up table, an accelerator pedal response curve, etc.). Once the maximum accelerator pedal position change ($\Delta Acc\_Ped_{max}$) is determined, the normalized accelerator pedal position change ($\Delta Acc\_Ped_{norm}$) may be computed by dividing the accelerator pedal position change ($\Delta Acc\_Ped$) by the maximum accelerator pedal position change ($\Delta Acc\_Ped_{max}$):

$$\Delta Acc\_Ped_{norm} = \frac{\Delta Acc\_Ped}{\Delta Acc\_Ped_{max}} \qquad \text{Eq. 8}$$

As previously described, the driving acceleration behavior feedback may generally be provided during vehicle acceleration events. Accordingly, the long-term acceleration behavior feedback signal may be used to further modify the normalized input for acceleration ($A_{norm}$) when the accelerator pedal position is above a threshold, vehicle speed is above a threshold, and vehicle acceleration is above a threshold. To this end, the normalized acceleration ($A_{norm}$) generated at block 56 may be multiplied by the long-term acceleration score ($L_a$) at multiplication junction 62 to produce the adapted normalized acceleration ($A_{adapted}$). The algorithm for generating the long-term acceleration score ($L_a$) is described in greater detail below. The controller 22 may determine the instantaneous acceleration score ($S_a$) at block 64. The adapted normalized acceleration ($A_{adapted}$), output from multiplication junction 62, may be an input to the instantaneous acceleration score determination block 64. The normalized total powertrain output power ($P_{norm}$) and the normalized accelerator pedal position change ($\Delta Acc\_Ped_{norm}$) may also be inputs to the instantaneous acceleration score determination block 64.

According to one or more embodiments of the present application, the instantaneous acceleration score ($S_a$) may be transmitted to the user interface 24 and displayed via the display 30. Additionally, the instantaneous acceleration score ($S_a$) may be compared to a function of the long-term acceleration score ($f(L_a)$) at block 66. Since the long-term acceleration score ($L_a$) may be based on the instantaneous acceleration score ($S_a$), the controller 22 can determine whether the driver's instantaneous acceleration behavior will generally increase or decrease the long-term acceleration score ($L_a$). Further, the controller 22 may select a forgetting factor (w) based on the comparison between the instantaneous acceleration score ($S_a$) and the function of the long-term acceleration score ($L_a$). For instance, if the instantaneous acceleration score ($S_a$) is greater than the long-term acceleration score ($L_a$), then it may be determined that the long-term acceleration score ($L_a$) will be increasing. If the long-term acceleration score ($L_a$) will be increasing, the controller 22 may output an increasing forgetting factor ($w_i$) at comparison block 66. On the other hand, if the instantaneous acceleration score ($S_a$) is less than the long-term acceleration score ($L_a$), then it may be determined that the long-term acceleration score ($L_a$) will be decreasing. In this case, the controller 22 may output a decreasing forgetting factor ($w_d$) at comparison block 66. Once the appropriate forgetting factor (w) is determined, the controller 22 may calculate a new long-term acceleration score ($L_a$) at block 68 based upon the previous long-term acceleration score, the instantaneous acceleration score, and the applicable forgetting factor. According to one or more embodiments of the present application, the new long-term acceleration score may be calculated according to Eq. 9 shown below:

$$L_{a(n)} = L_{a(n-1)}(w) + S_a(1-w) \qquad \text{Eq. 9}$$

Where:
$L_{a(n)}$=the new long-term acceleration score
$L_{a(n-1)}$=the previous long-term acceleration score
$S_a$=the instantaneous acceleration score
w=the forgetting factor (e.g., $w_i$ or $w_d$)

The term "long-term" in the long-term acceleration score ($L_a$) may be a relative one. With respect to the instantaneous acceleration score ($S_a$), the long-term acceleration score ($L_a$) may provide drivers with relatively long-term feedback on their driving behavior. In this regard, the long-term acceleration score ($L_a$) may reflect overall driving acceleration behavior over a moving period of several seconds to several minutes or even hours. The value of the forgetting factor (w) may be chosen to reflect the length of the moving period. The higher the forgetting factor, the greater the weight that may be placed on the long-term acceleration score ($L_a$). According to one or more embodiments, the increasing forgetting factor ($w_i$) may be set greater than the decreasing forgetting factor ($w_d$) so that the instantaneous acceleration score ($S_a$) may have less impact on the long-term acceleration score ($L_a$) when the long-term acceleration score is increasing (i.e., $L_a < S_a$).

An increasing long-term acceleration score ($L_a$) may be an indication that the driver is accepting or otherwise responding to the driving acceleration behavior feedback. A decreasing long-term acceleration score ($L_a$) may provide an indication that the driver is generally rejecting or otherwise ignoring the driving acceleration behavior feedback. If the driver generally ignores the acceleration behavior feedback, such that over time the driver may have a relatively low long-term acceleration score ($L_a$), then the system may adapt the driving acceleration behavior feedback it provides so as to be less critical of inefficient acceleration behavior. Stated differently, the feedback conveyed by the system for relatively poor driving acceleration behavior events may not be as penal or otherwise adversely affect the long-term acceleration score ($L_a$) for routinely aggressive drivers, that tend not to heed the acceleration behavior coaching, as compared to drivers with traditionally good driving acceleration behavior. Thus, if the driver is generally receptive to the driving acceleration behavior feedback by modifying his or her acceleration behavior accordingly, then the system may be more sensitive with respect to future acceleration behavior events in order to continue encouraging further behavior modification. To this end, the controller 22 may use the long-term acceleration score ($L_a$) to adapt the normalized acceleration input to the instantaneous acceleration score determination block 64 so that the driving acceleration behavior feedback is more critical of, or responsive to, relatively nonaggressive drivers. As previously described, the normalized acceleration input ($A_{norm}$) may be multiplied by the long-term acceleration score ($L_a$) at multiplication junction 62 to generate the adapted normalized acceleration input ($A_{adapted}$).

Figure 4:
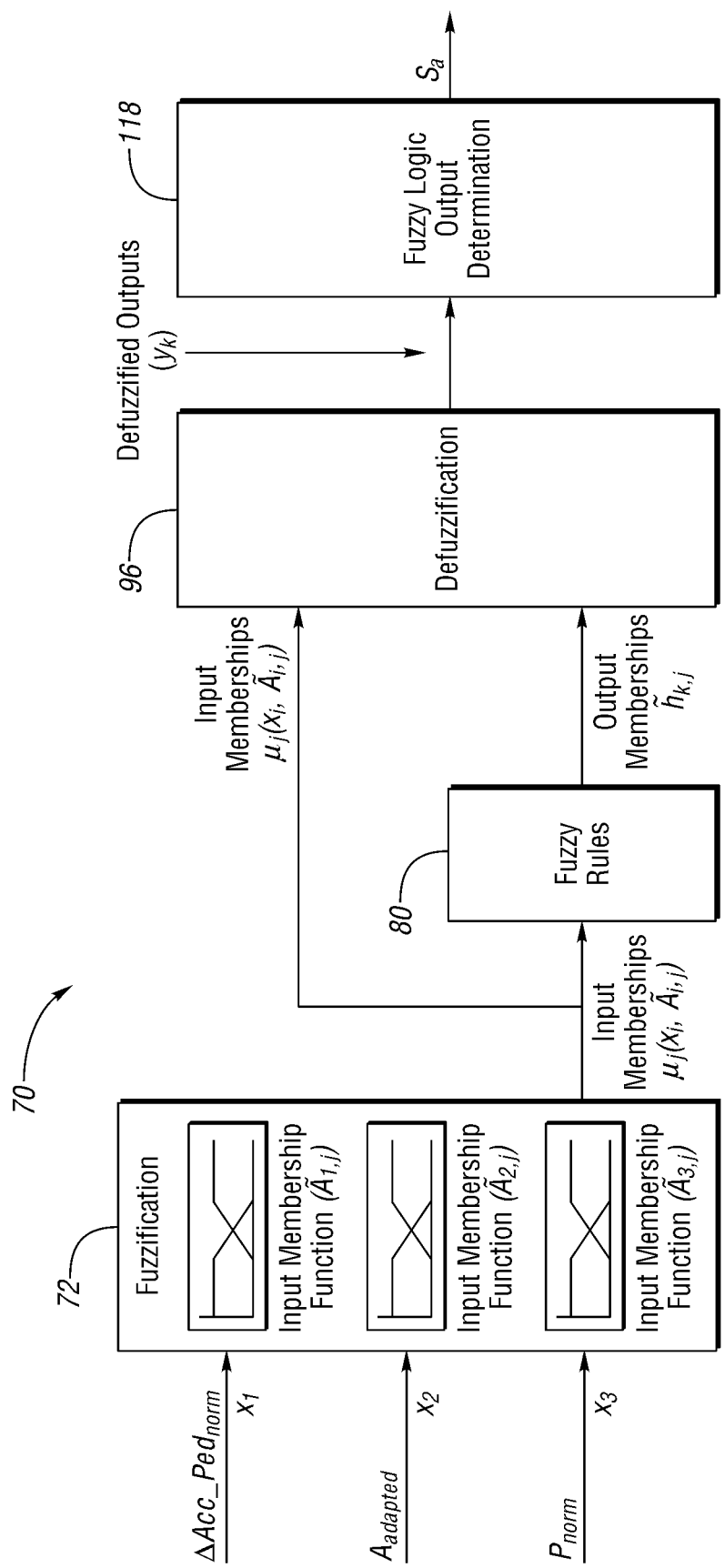
FIG. 4 is a functional block diagram illustrating a fuzzy logic control algorithm in accordance with one or more embodiments of the present application.

FIG. 4 is a functional block diagram illustrating a fuzzy logic control algorithm 70 in accordance with one or more embodiments of the present application. The fuzzy logic control algorithm 70 may correspond to determination block 64 in FIG. 3 for determining the instantaneous acceleration score ($S_a$). The fuzzy logic control algorithm 70 may be carried out using a fuzzy logic controller. The fuzzy logic controller may be contained within the controller 22, and may be implemented in hardware and/or software control logic as described in greater detail herein. As shown, the adapted normalized acceleration ($A_{adapted}$), the normalized total powertrain output power ($P_{norm}$), and the normalized accelerator pedal position change ($\Delta Acc\_Ped_{norm}$) may be fuzzy input variables ($x_i$).

Figure 5A:
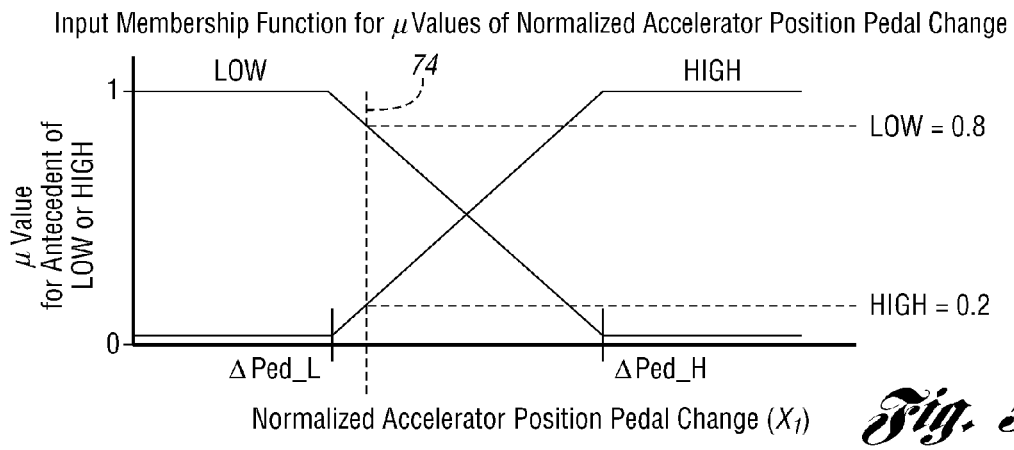
FIGS. 5a-c depict exemplary input membership functions for use in generating input membership values based on a set of fuzzy input variables in accordance with one or more embodiments of the present application.

Input membership functions may be applied to the normalized fuzzy inputs ($x_i$) at fuzzification block 72. With general reference to FIGS. 5a-c, exemplary input membership functions ($\tilde{A}_{i,j}$) for the fuzzy input variables ($x_i$) are illustrated in accordance with one or more embodiments of the present application. As shown, each fuzzy input ($x_i$) may have a corresponding input membership function ($\tilde{A}_{i,j}$) having two truth values—one for LOW and one for HIGH. The truth values may be referred to herein as input membership values, $\mu_i(x_i, \tilde{A}_{i,j})$. Thus, each input membership function ($\tilde{A}_{i,j}$) may be used to generate the input membership values, $\mu_i(x_i, \tilde{A}_{i,j})$, for fuzzy rule antecedents of "LOW" and "HIGH" for a given normalized fuzzy input ($x_i$). With specific reference to FIG. 5a, an input membership function ($\tilde{A}_{1,j}$) for use in generating input membership values, $\mu_i(x_1, \tilde{A}_{1,j})$ for the normalized accelerator pedal position change fuzzy input ($x_1 = \Delta Acc\_Ped_{norm}$) is illustrated. As an example, vertical line 74 may represent a particular normalized accelerator pedal position change input value ($x_1$). As shown, the input membership value for the antecedent of "LOW" may be 0.8, while the input membership value for the antecedent of "HIGH" may be 0.2.

Figure 5B:
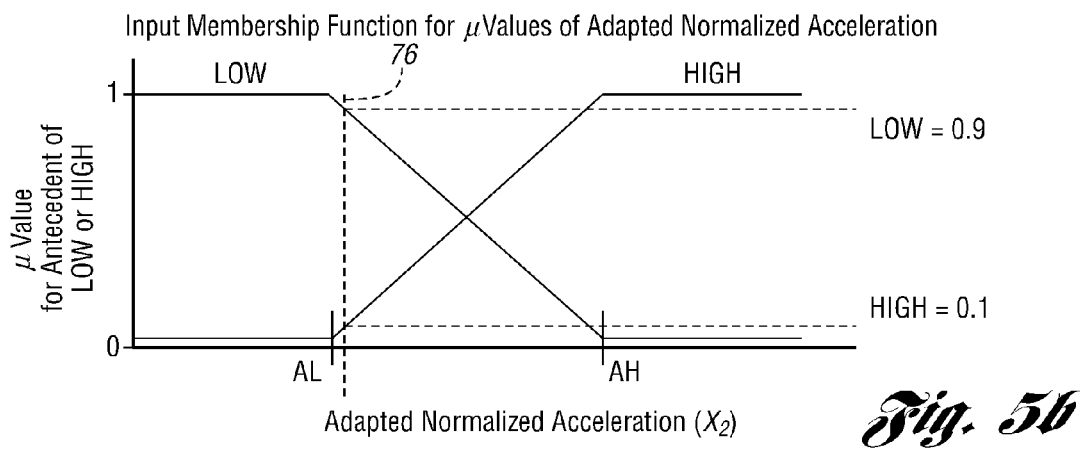
Figure 5C:
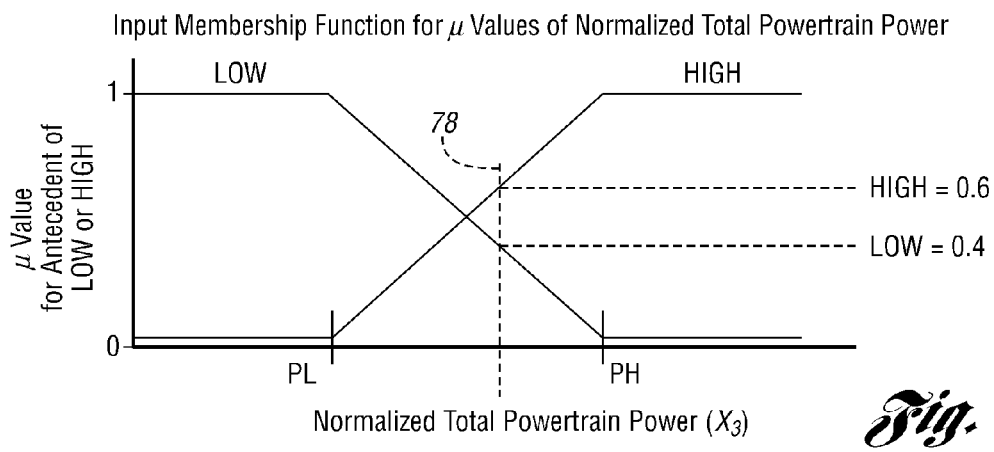

FIG. 5b illustrates an input membership function ($\tilde{A}_{2,j}$) for use in generating input membership values, $\mu_i(x_2, \tilde{A}_{2,j})$, for the adapted normalized acceleration fuzzy input ($x_2 = A_{adapted}$). Vertical line 76 may represent a particular adapted normalized acceleration input value ($x_2$). As shown in this example, the input membership value for the antecedent of "LOW" may be 0.9, while the input membership value for the antecedent of "HIGH" may be 0.1. FIG. 5c illustrates an input membership function ($\tilde{A}_{3,j}$) for use in generating the input membership values, $\mu_i(x_3, \tilde{A}_{3,j})$, for the normalized total powertrain output power fuzzy input ($x_3 = P_{norm}$). Vertical line 78 may represent a particular normalized total powertrain output power input value ($x_3$). As shown in the example, the input membership value for the antecedent of "LOW" may be 0.4, while the input membership value for the antecedent of "HIGH" may be 0.6.

Referring back to FIG. 4, the fuzzy logic controller may apply a set of fuzzy rules at block 80 for use in generating a plurality of output membership values ($\tilde{h}_{k,j}$). FIG. 6 shows a table 82 illustrating an exemplary set of fuzzy rules in accordance with one or more embodiments of the present application. In the illustrated embodiment, eight (8) fuzzy rules are shown corresponding to the number of event multiples for the three normalized fuzzy inputs for accelerator pedal position change ($x_1$), adapted normalized acceleration ($x_2$), and normalized total powertrain output power ($x_3$), each of which has two possible outcomes (e.g., HIGH or LOW). Each row in table 82 below a header 84 may correspond to a different fuzzy rule, the j-th rule. Table 82 may include three antecedent columns 86 after a rule number column 88. The antecedent columns 86 generally depict the rule antecedents for the three fuzzy input variables ($x_i$): normalized accelerator pedal position change ($x_1$), adapted normalized acceleration ($x_2$), and normalized total powertrain output power ($x_3$). As described above, the rule antecedents may relate to the input membership values, $\mu_j(x_i, \tilde{A}_{i,j})$.

Each fuzzy rule in the illustrated embodiment may also have three rule consequents. Accordingly, table 82 may further include three consequent columns 90 adjacent to the antecedent columns 86. The three rule consequents may correspond to three fuzzy output variables, referred to as defuzzified outputs ($y_k$), which can be used to determine the instantaneous acceleration score ($S_a$). According to one or more embodiments, the three fuzzy output variables may include an advised change in acceleration score ($y_1$), a maximum acceleration score offset ($y_2$), and a minimum acceleration score offset ($y_3$). The advised change in acceleration score output ($y_1$) may correspond to a recommended change in vehicle acceleration requested by the driver via the accelerator pedal. The maximum acceleration score offset output ($y_2$) may correspond to a maximum advised change in the driver requested power. The minimum acceleration score offset output ($y_3$) may correspond to a minimum advised change in the driver requested acceleration. Since the ultimate output to the fuzzy logic algorithm 70 is the instantaneous acceleration score ($S_a$), the advised change in driver acceleration may generally correspond to a change in the instantaneous acceleration score, as will be described in greater detail below.

Figure 7:
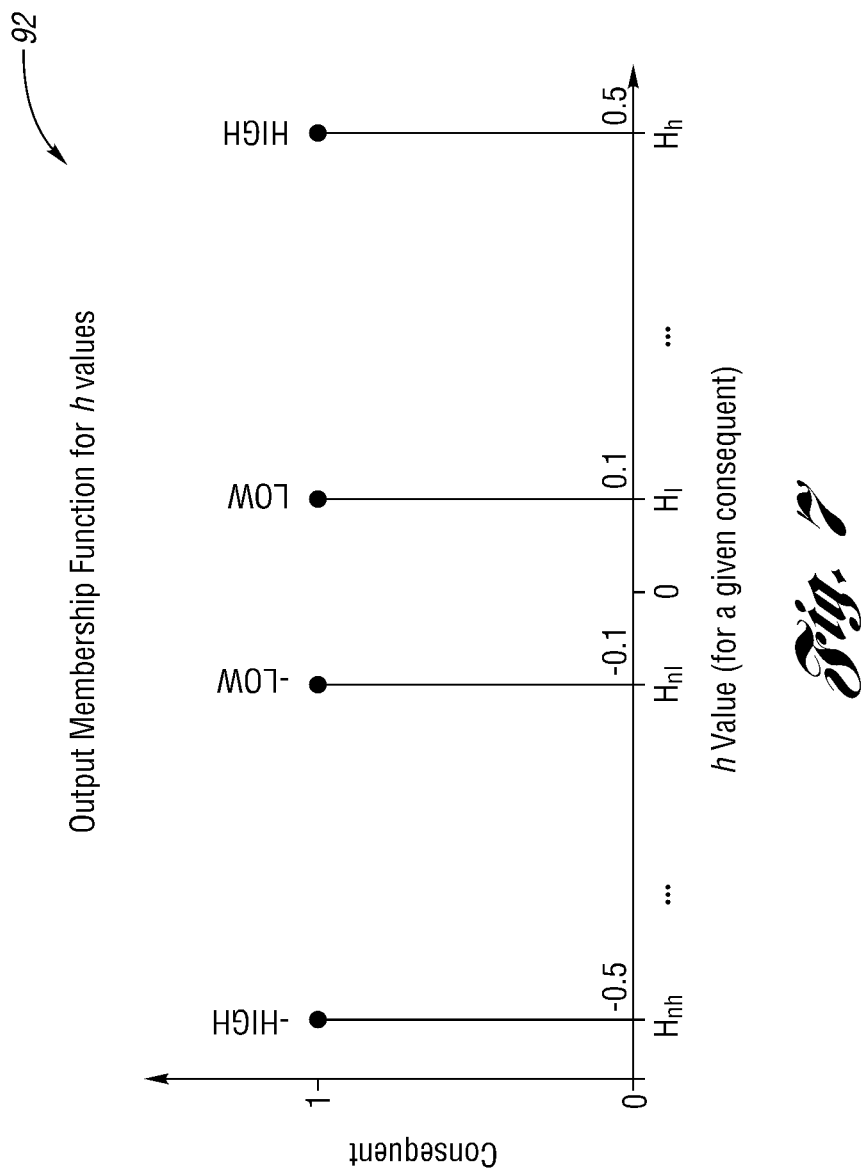
FIG. 7 depicts a simplified, exemplary output membership function for determining output membership values in accordance with one or more embodiments of the present application.

The rule consequents may be used in the generation of the output membership values ($\tilde{h}_{k,j}$). For instance, each fuzzy output variable ($y_k$) may be associated with an output membership function for determining the output membership values ($\tilde{h}_{k,j}$) used to calculate the defuzzified output values. FIG. 7 depicts a simplified, exemplary output membership function 92 for determining the output membership value ($\tilde{h}_{1,j}$) for a given rule consequent of the advised change in acceleration score fuzzy output variable ($y_1$). As seen therein, the output membership value for the consequent of "HIGH" may be 0.5, whereas the output membership value for the consequent of "LOW" may be 0.1. The output membership value for the consequent of "–HIGH" may be –0.5, whereas the output membership value for the consequent of "–LOW" may be –0.1. Although FIG. 7 depicts an exemplary output membership function for determining output membership values ($\tilde{h}_{k,j}$) for the advised change in acceleration score rule consequents (where k=1), similar output membership functions may be applied for determining the output membership values associated with the maximum acceleration score offset and minimum acceleration score offset rule consequents. Alternatively, the maximum and minimum acceleration score offsets may be optional fuzzy logic output variables. In this manner, all the rule consequents for the maximum acceleration score offset output ($y_2$) may effectively be HIGH (where HIGH=1). Similarly, all the rule consequents for the minimum acceleration score offset output ($y_3$) may effectively be LOW (where LOW=0). Moreover, different output membership values ($\tilde{h}_{1,j}$) than those that are shown may be provided by output membership function 92 for the rule consequents for the advised change in acceleration score fuzzy output variable, depending upon the particular implementation.

Referring back to FIG. 6, table 82 may further include a comments column 94, which provides a brief description of the driving acceleration behavior conditions satisfying each fuzzy rule and, in some instances, a proposed system response for providing feedback to the driver when the conditions are met. For instance, with reference to the first fuzzy rule (j=1), the system may provide positive instantaneous acceleration behavior feedback when the driver pedal response is steady or in the low range, the vehicle acceleration is in the low range, and the total power is in the low range. With reference to the second fuzzy rule (j=2), the system may provide relatively slow positive instantaneous acceleration behavior feedback when the driver pedal response is steady or in the low range, the vehicle acceleration is in the low range, and total power is in the higher range. The preceding scenario can occur under colder climate conditions when the powertrain may be cold and requires more power for heating powertrain components. This condition may also cover the case when a vehicle is going uphill and, therefore, is consuming more power.

With reference to the third fuzzy rule (j=3), the system may provide relatively slow positive instantaneous acceleration behavior feedback when the driver pedal response is steady or in the low range, the vehicle acceleration is in the higher range, and the total power is in the low range. This scenario can occur under downhill conditions when acceleration may be higher while the total power is in the lower range. With reference to the fourth fuzzy rule (j=4), the system may provide negative instantaneous acceleration behavior feedback when the driver pedal response is steady or in low range, the vehicle acceleration is in the higher range, and the total power is in the higher range. This case can occur when the vehicle is engaging in a clearly inefficient operation, such as during relatively aggressive driving.

With reference to the fifth fuzzy rule (j=5), the system may prepare for an anticipated negative instantaneous acceleration behavior feedback when the driver pedal response is transient or in the high range, the vehicle acceleration is in the low range, and the total power is in the low range. This scenario can occur when the current conditions are relatively efficient, but based on the driver pedal response, the system may anticipate or otherwise predict that an inefficient operation is forthcoming in the near future. With reference to the sixth fuzzy rule (j=6), the system may prepare for an anticipated negative instantaneous acceleration behavior feedback when the driver pedal response is transient or in the high range, the vehicle acceleration is in the low range, and the total power is in the high range. This scenario can occur when a vehicle is going uphill and, as a result, the vehicle acceleration may already be low but the total power may be high. Therefore, any transient increase in driver pedal response may not necessarily reflect an energy inefficient operation, but the system may nevertheless prepare for possible inefficiency if such a condition was to disappear. This scenario may also cover the case when the powertrain is cold and requires more power for heating the powertrain components.

With reference to the seventh fuzzy rule (j=7), the system may prepare to provide a slow negative instantaneous acceleration behavior feedback when the driver pedal response is transient or in the high range, the vehicle acceleration is in the high range, and the total power is in the low range. This scenario can occur when a vehicle is going downhill and, as a result, the vehicle acceleration may already be high but the total power may be low. Therefore, any transient increase in driver pedal response could result in future energy inefficiency. Accordingly, the system may anticipate this potential future energy inefficiency by preparing to provide the slow negative instantaneous acceleration behavior feedback.

With reference to the eighth fuzzy rule (j=8), the system may provide a negative instantaneous acceleration behavior feedback when the driver pedal response is transient or in the high range, the vehicle acceleration is in the high range, and the total power is in the high range.

According to one or more embodiments of the present application, the j-th rule operation may be represented using the following expression:

$$\mu_j(x_1,\tilde{A}_{1,j})\mu_j(x_2,\tilde{A}_{2,j})\mu_j(x_3,\tilde{A}_{3,j})$$

Where:
$x_i$=normalized fuzzy input variables (i=1, 2, 3)
$\tilde{A}_{i,j}$=input membership functions
$\mu_j(x_i,\tilde{A}_{i,j})$=input membership value of the rule antecedent of the j-th rule for a given normalized input ($x_i$) and its corresponding input membership function ($\tilde{A}_{i,j}$)

Referring back to FIG. 4, once determined, the output membership value sets ($\tilde{h}_{k,j}$) and the input membership value sets ($\mu_j(x_i,\tilde{A}_{i,j})$) may undergo defuzzification at block 96. At defuzzification block 96, fuzzy operator implication and aggregation may occur using the input and output membership value sets. The controller 22 may calculate the outputs of defuzzification ($y_k$) according to Eq. 10 as set forth below:

$$y_k = \frac{\sum_{j=1}^{\Omega} \mu_j(x_1,\tilde{A}_{1,j})\mu_j(x_2,\tilde{A}_{2,j})\mu_j(x_3,\tilde{A}_{3,j})\tilde{h}_{k,j}}{\sum_{j=1}^{\Omega} \mu_j(x_1,\tilde{A}_{1,j})\mu_j(x_2,\tilde{A}_{2,j})\mu_j(x_3,\tilde{A}_{3,j})}; \quad \text{Eq. 10}$$

$$k = 1, 2, 3$$

Where:
$\Omega$=total number of fuzzy rules (e.g., eight)
$x_i$=normalized fuzzy input variables (i=1, 2, 3)
$\tilde{A}_{i,j}$=input membership functions
$\mu_j(x_i,\tilde{A}_{i,j})$=input membership value of the rule antecedent of the j-th rule for a given normalized input ($x_i$) and its corresponding input membership function ($\tilde{A}_{i,j}$)
$\tilde{h}_{k,j}$=output membership value of the rule consequent of the j-th rule for a given fuzzy output variable and its corresponding output membership function As set forth above, the controller 22 may generate three (3) defuzzified outputs ($y_k$) at defuzzification block 96. Moreover, the three defuzzified outputs ($y_k$) may be associated with the three rule consequents shown by table 82 in FIG. 6, namely: the advised change in acceleration score, the maximum acceleration score offset, and the minimum acceleration score offset.

Figure 8:
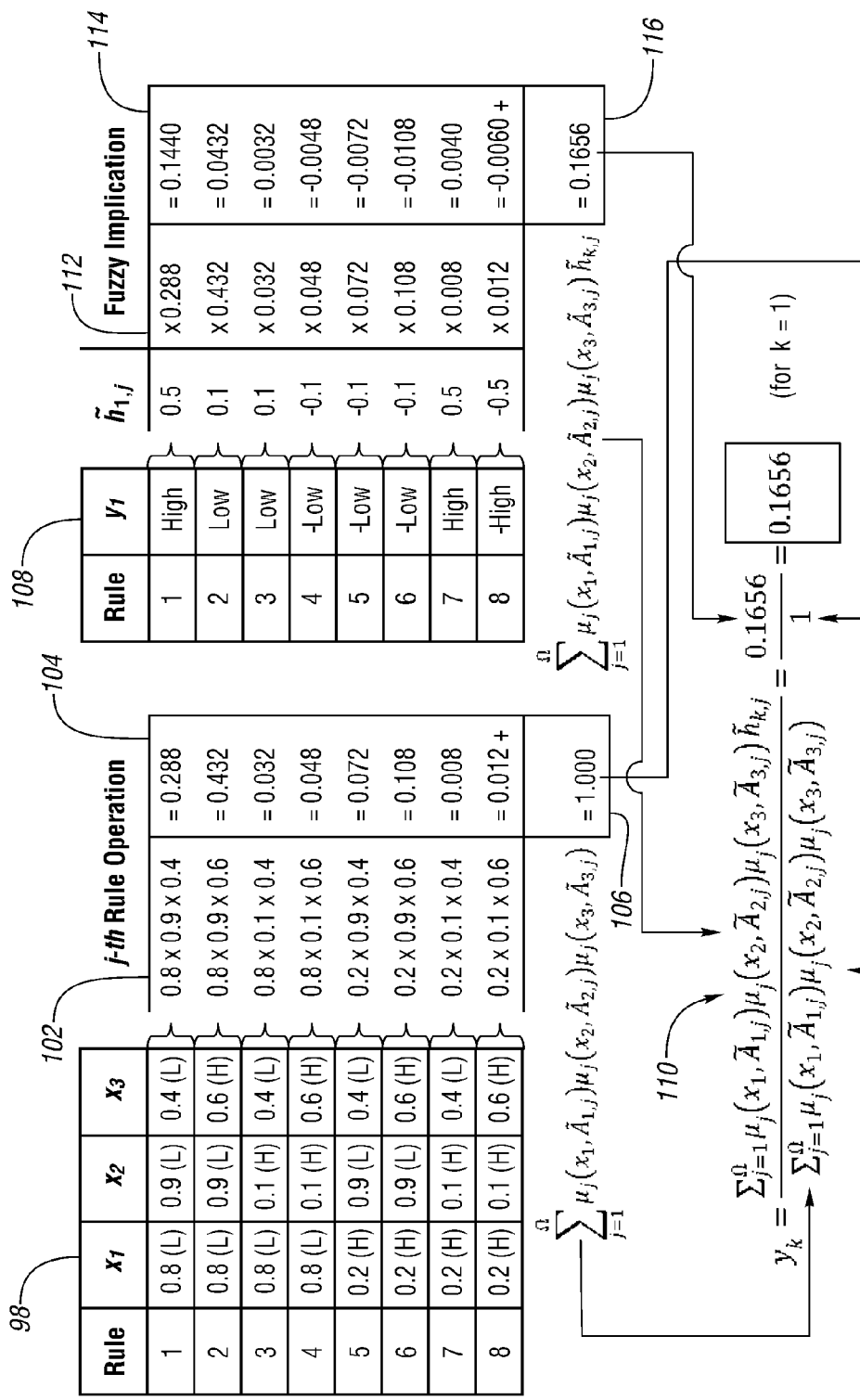
FIG. 8 is an exemplary flow diagram an implementation of a deffuzzification process using a real-world example in accordance with one or more embodiments of the present application.

FIG. 8 is an exemplary flow diagram illustrating an implementation of the defuzzification algorithm using a real-world example. Table 98 demonstrates how a denominator 100 from Eq. 10 may be calculated. As shown in table 98, the antecedents of "LOW" and "HIGH" for each fuzzy rule have been replaced by the corresponding input membership values, $\mu_j(x_i,\tilde{A}_{i,j})$, for each normalized input ($x_i$) and its input membership function ($\tilde{A}_{i,j}$). In this example, the input membership values in table 98 correspond to the input membership values obtained using the input membership functions shown in FIGS. 5a-c for the particular normalized inputs ($x_i$) depicted by vertical lines 74, 76, 78. These input membership values may become the antecedent operators for the j-th rule operation, $\mu_j(x_1,\tilde{A}_{1,j})\mu_j(x_2,\tilde{A}_{2,j})\mu_j(x_3,\tilde{A}_{3,j})$, as shown in column 102. The results of the j-th rule operations are shown in column 104. The results of the j-th rule operations may be aggregated. The sum of the j-th rule operations is shown at the bottom of column 104 in cell 106. The sum of the results of the j-th rule operations becomes the denominator 100 for calculating the defuzzified outputs ($y_k$) as set forth in Eq. 10. As shown, the summation for the j-th rule operations is equal to one (1).

Table 108 demonstrates how a numerator 110 from Eq. 10 may be calculated. As shown in table 108, the consequents of "LOW," "HIGH," "−LOW" and "−HIGH" may be replaced by the corresponding output membership values ($\tilde{h}_{k,j}$) for each fuzzy output variable (where k=1, 2, 3) and its corresponding output membership function. For explanation purposes, in this example, table 108 only shows the output membership value set ($\tilde{h}_{1,j}$) for use in calculating the numerator 110 of the defuzzified output ($y_1$), which corresponds to the advised change in acceleration score output variable (where k=1). However, the numerator 110 for each defuzzified output ($y_k$) may be calculated in a similar fashion using the associated output membership value sets ($\tilde{h}_{k,j}$). In this example, the output membership values ($\tilde{h}_{1,j}$) may correspond to the exemplary output membership values obtained from the sample output membership function 92 shown in FIG. 7. By way of fuzzy implication, each result from the j-th rule operation, $\mu_j(x_1,\tilde{A}_{1,j})\mu_j(x_2,\tilde{A}_{2,j})\mu_j(x_3,\tilde{A}_{3,j})$, may be multiplied by its corresponding output membership value ($\tilde{h}_{1,j}$), as shown in column 112. The results of the fuzzy implications are shown in column 114. The results of the fuzzy implications may also be aggregated. The sum of the aggregated results is shown at the bottom of column 114 in cell 116. The sum of the results of the fuzzy implications becomes the numerator 110 for the defuzzified outputs ($y_k$) as set forth in Eq. 10. As shown in FIG. 8, in this example, the numerator 110 for the deffuzified output ($y_1$) is equal to 0.1656.

Referring back to FIG. 4, once all the defuzzified outputs ($y_k$) are generated at defuzzification block 96, the controller 22 may determine the fuzzy logic output as provided at block 118. As shown, the fuzzy logic output may be the instantaneous acceleration score ($S_a$). The controller 22 may calculate the instantaneous acceleration score ($S_a$) from the defuzzified outputs ($y_k$) according to Eq. 11 and Eq. 12 as set forth below:

$$S_{tmp} = \int y_1 dt \quad \text{Eq. 11}$$

$$S_a = \begin{cases} 1 + y_2, & \text{if } S_{tmp} > (1 + y_2) \\ S_{tmp}, & \text{if } y_3 \leq S_{tmp} \leq (1 + y_2) \\ y_3, & \text{if } S_{tmp} < y_3 \end{cases} \quad \text{Eq. 12}$$

Where:
$y_k$=defuzzified outputs (k=1, 2, 3)
$y_1$: advised change in acceleration score
$y_2$: max acceleration score offset
$y_3$: min acceleration score offset Once determined, the instantaneous acceleration score ($S_a$) may be transmitted to the user interface 24 and conveyed to a driver using display 30. The instantaneous acceleration score ($S_a$) may be conveyed to the driver using the acceleration feedback gauge 32a. According to one or more embodiments, the location of the acceleration feedback indicator 34 along the acceleration feedback gauge 32a may correspond to the instantaneous acceleration score ($S_a$). Additionally or alternatively, the color of at least a portion of the acceleration feedback gauge 32a may be associated with the instantaneous acceleration score ($S_a$). For instance, when the instantaneous acceleration score ($S_a$) is within a first range, at least a portion of the acceleration feedback gauge 32a may be displayed in a first color. Further, when the instantaneous acceleration score ($S_a$) is within a second range, at least a portion of the acceleration feedback gauge 32a may be displayed in a second color different from the first. Moreover, when the instantaneous acceleration score ($S_a$) is within a third range, at least a portion of the acceleration feedback gauge 32a may be displayed in a third color, which may be different from the first and second color. Fewer or greater instantaneous acceleration score ranges and associated colors may be implemented to convey the instantaneous acceleration score ($S_a$) in accordance with one or more embodiments of the present application.

Additionally, as previously described, the instantaneous acceleration score ($S_a$) may be used to calculate the long-term acceleration score ($L_a$) as set forth above in Eq. 9. The long-term acceleration score ($L_a$) may be transmitted to the user interface 24 and conveyed to a driver using display 30. The long-term acceleration score ($L_a$) may be conveyed to the driver using the acceleration feedback gauge 32a. According to one or more embodiments, the location of the acceleration feedback indicator 34 along the acceleration feedback gauge 32a may correspond to the long-term acceleration score ($L_a$). In this case, the instantaneous acceleration score ($S_a$) may be conveyed by the user interface 24 in another manner (e.g., the color of at least a portion of the acceleration feedback gauge 32a), or not at all. Additionally or alternatively, the color of at least a portion of the acceleration feedback gauge 32a may also be associated with the long-term acceleration score ($L_a$).

Figure 9:
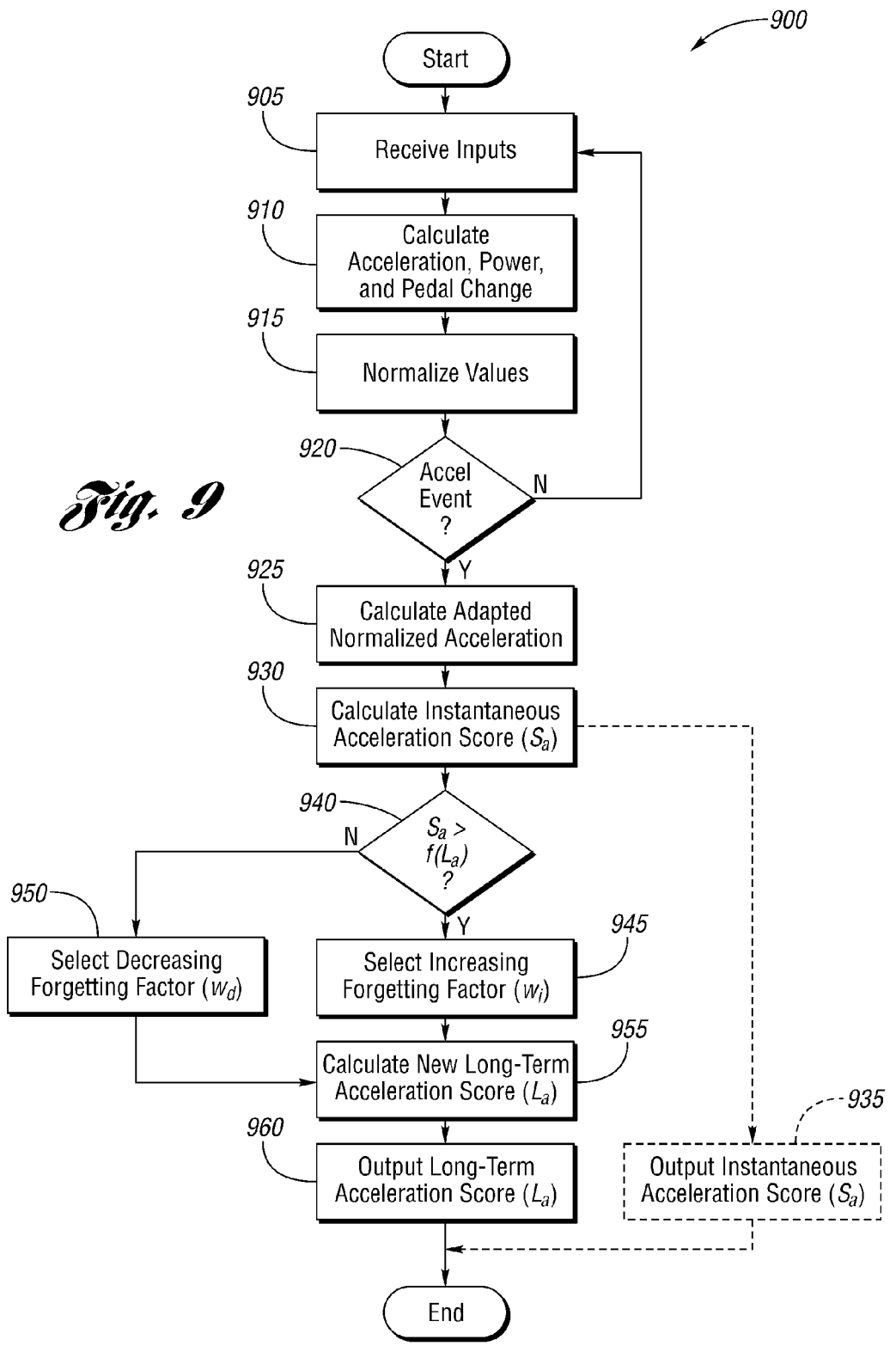
FIG. 9 is a simplified, exemplary flow chart depicting a method for conveying driving acceleration behavior feedback in accordance with one or more embodiments of the present application.

FIG. 9 is a simplified, exemplary flow chart 900 depicting a method for conveying driving acceleration behavior feedback in accordance with one or more embodiments of the present application. At step 905, the system may receive inputs such as input signals 26. The input signals 26 may be generally indicative of vehicle speed ($V_{spd}$), vehicle acceleration ($A_{actual}$), total powertrain output power ($P_{total}$), and/or the accelerator pedal position change ($\Delta Acc\_Ped$). Exemplary input signals may include an accelerator pedal position signal (APPS), high-voltage (HV) battery power ($P_{batt}$), fuel flow rate (Fuel_Flow), vehicle speed ($V_{spd}$) and/or output shaft speed ($\omega_{oss}$). (The system may compute vehicle acceleration ($A_{actual}$), total powertrain output power ($P_{total}$), and/or the accelerator pedal position change ($\Delta Acc\_Ped$) from the input signals 26 at step 910. The vehicle acceleration ($A_{actual}$) may be calculated from the vehicle speed ($V_{spd}$) and/or output shaft speed ($\omega_{oss}$). The total powertrain output power ($P_{total}$), may be calculated differently depending upon the powertrain configuration. In general, the total powertrain output power ($P_{total}$) may be the sum of the battery power ($P_{batt}$) and fuel power ($P_{fuel}$). However, depending upon the powertrain technology, either the battery power ($P_{batt}$) or fuel power ($P_{fuel}$) may be equal to zero. The accelerator pedal position change ($\Delta Acc\_Ped$) may be determined from the accelerator pedal position signal (APPS).

At step 915, the vehicle acceleration ($A_{actual}$), total powertrain output power ($P_{total}$), and accelerator pedal position change ($\Delta Acc\_Ped$) may be normalized. In particular, the vehicle acceleration ($A_{actual}$), total powertrain output power ($P_{total}$), and accelerator pedal position change ($\Delta Acc\_Ped$) may be modified as a function of vehicle speed ($V_{spd}$) to obtain the normalized acceleration ($A_{norm}$), the normalized total powertrain output power ($P_{norm}$), and the normalized accelerator pedal position change ($\Delta Acc\_Ped_{norm}$), respectively. The acceleration, total powertrain output power, and accelerator pedal position change may be normalized with respect to vehicle speed to adjust for vehicle behavior and operating characteristics at different speeds, as well as account for the vehicle speed when determining the driving acceleration behavior feedback.

At step 920, system may determine whether an acceleration event has occurred or is occurring. The system may convey driving acceleration behavior feedback when an acceleration event is detected. According to one or more embodiments, an acceleration event may be detected when the accelerator pedal position is above a pedal position threshold, the vehicle speed is above a speed threshold, and the vehicle acceleration is above an acceleration threshold. If no acceleration event is detected, the method may return to step 905 where the input signals 26 can continue to be monitored. If, on the other hand, an acceleration event is detected at step 920, the method may proceed to step 925.

At step 925, the system may calculate the adapted normalized acceleration ($A_{adapted}$). According to one or more embodiments, the normalized acceleration input ($A_{norm}$) may be modified based on driver responsiveness to the driving acceleration behavior feedback. In this regard, the normalized acceleration ($A_{norm}$) may be multiplied by the long-term acceleration score ($L_a$) to generate the adapted normalized acceleration ($A_{adapted}$). At step 930, the system may calculate the instantaneous acceleration score ($S_a$) based upon the adapted normalized acceleration ($A_{adapted}$), the normalized total powertrain output power ($P_{norm}$), and the normalized accelerator pedal position change ($\Delta Acc\_Ped_{norm}$). In one or more embodiments, the instantaneous acceleration score ($S_a$) may be output to the user interface 24 where it may be conveyed to a driver, as provided at step 935. The instantaneous acceleration score ($S_a$) may be conveyed to the driver using the acceleration feedback gauge 32a. According to one or more embodiments, the location of the acceleration feedback indicator 34 along the acceleration feedback gauge 32a may correspond to the instantaneous acceleration score ($S_a$). Additionally or alternatively, the color of at least a portion of the acceleration feedback gauge 32a may be associated with the instantaneous acceleration score ($S_a$).

Additionally, the instantaneous acceleration score ($S_a$) may be compared to a function of the long-term acceleration score ($f(L_a)$) to determine whether the driver's instantaneous acceleration behavior will increase or decrease the long-term acceleration score ($L_a$), at step 940. According to one or more embodiments, $f(L_a)$ may be set equal to $L_a$. In this manner, if the instantaneous acceleration score ($S_a$) is greater than the long-term acceleration score ($L_a$), the system may conclude that the long-term acceleration score is increasing. Accordingly, the system may select an increasing forgetting factor ($w_i$) at step 945. If, on the other hand, the instantaneous acceleration score ($S_a$) is less than the long-term acceleration score ($L_a$), the system may conclude that the long-term acceleration score is decreasing. Accordingly, the system may select a decreasing forgetting factor ($w_d$) at step 950. The instantaneous acceleration score ($S_a$) may be compared to alternative functions of the long-term acceleration score (f($L_a$)) to determine whether the driver's instantaneous acceleration behavior will increase or decrease the long-term acceleration score ($L_a$). Once the appropriate forgetting factor (w) is selected, the method may proceed to step 955.

At step 955, the system may compute a new long-term acceleration score ($L_a$). According to one or more embodiments of the present application, the new long-term acceleration score ($L_a$) may be based upon the previous long-term acceleration score, the instantaneous acceleration score ($S_a$), and the selected forgetting factor (w) according to Eq. 9 set forth above. Once calculated, the long-term acceleration score ($L_a$) may be output to the user interface 24 where it may be conveyed to a driver, as provided at step 960. The long-term acceleration score ($L_a$) may be conveyed to the driver using the acceleration feedback gauge 32a. According to one or more embodiments, the location of the acceleration feedback indicator 34 along the acceleration feedback gauge 32a may correspond to the long-term acceleration score ($L_a$). In this case, the instantaneous acceleration score ($S_a$) may be conveyed by the user interface 24 in another manner (e.g., the color of at least a portion of the acceleration feedback gauge 32a, or not at all. Additionally or alternatively, the color of at least a portion of the acceleration feedback gauge 32a may also be associated with the long-term acceleration score ($L_a$).

Figure 10:
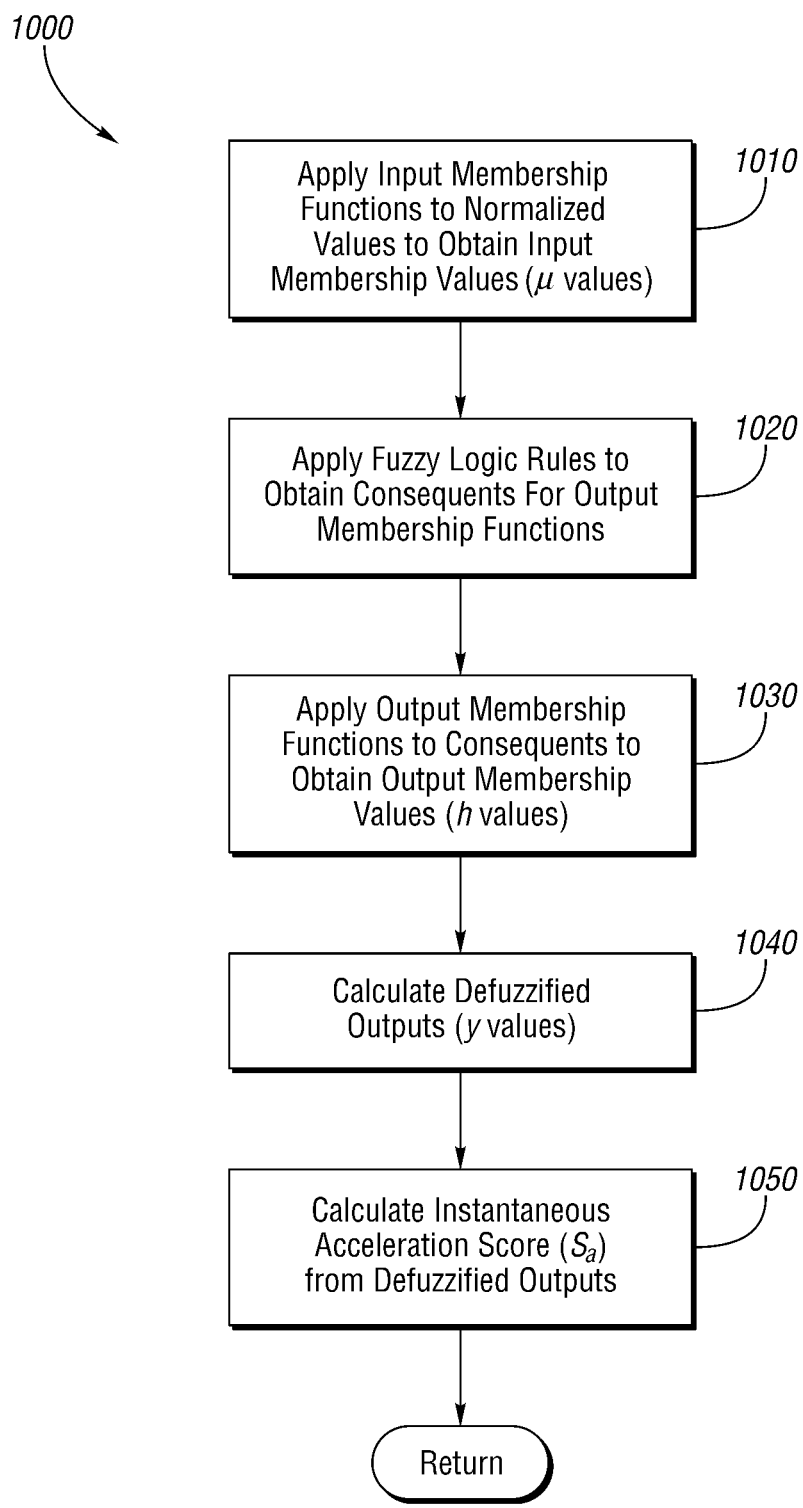
FIG. 10 is a simplified, exemplary flowchart depicting a method for calculating an instantaneous acceleration score in accordance with one or more embodiments of the present application.

FIG. 10 is a simplified, exemplary flowchart 1000 depicting the process for calculating the instantaneous acceleration score ($S_a$) at step 930 in FIG. 9 in greater detail in accordance with one or more embodiments of the present application. As previously described, the instantaneous acceleration score ($S_a$) may be calculated using a fuzzy logic algorithm. To this end, input membership functions ($\tilde{A}_{i,j}$) may be applied to obtain input membership values, $\mu_j(x_i, \tilde{A}_{i,j})$, for a given set of normalized fuzzy input variables ($x_i$), at step 1010. At step 1020, the set of fuzzy logic rules may be applied to obtain the rule consequents for use in generating the set of output membership values ($\tilde{h}_{k,j}$). At step 1030, an output membership function may be applied to the fuzzy rule consequents for each fuzzy output variable to obtain the output membership values ($\tilde{h}_{k,j}$). At step 1040, the system may calculate the defuzzified outputs ($y_k$) for each fuzzy output variable according to Eq. 10 set forth above. The first defuzzified output ($y_1$) may correspond to an advised change in driver requested acceleration. The second defuzzified output ($y_2$) may correspond to a maximum acceleration score offset. The third defuzzified output ($y_3$) may correspond to a minimum acceleration score offset. At step 1050, the system may calculate the instantaneous acceleration score ($S_a$) based upon the defuzzified outputs ($y_k$) according to Eq. 11 and Eq. 12 set forth above. Once the instantaneous acceleration score ($S_a$) is calculated, the method may return to step 940 in FIG. 9 for the calculation of the long-term acceleration score ($L_a$).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
   a controller configured to receive input indicative of vehicle acceleration, accelerator pedal position change and powertrain output power, calculate an instantaneous acceleration score based upon the input, and output a long-term acceleration score based upon the instantaneous acceleration score, a previous long-term acceleration score, and a forgetting factor weighting the instantaneous and long-term deceleration scores; and
   an interface configured to display an acceleration feedback indicator indicative of the long-term acceleration score.

2. The system of claim 1, wherein the interface includes an acceleration feedback gauge for displaying the acceleration feedback indicator, and wherein the interface is configured to adjust the acceleration feedback indicator within the acceleration feedback gauge based on the long-term acceleration score.

3. The system of claim 2, wherein the interface is further configured to adjust a color of at least a portion of the acceleration feedback gauge based on the instantaneous acceleration score.

4. The system of claim 1, wherein the controller is further configured to normalize one or more of the vehicle acceleration, the powertrain output power and the accelerator pedal position change based upon vehicle speed prior to calculating the instantaneous acceleration score.

5. The system of claim 1, wherein the controller is further configured to calculate an adapted acceleration value prior to calculating the instantaneous acceleration score, the adapted acceleration value being based on the vehicle acceleration and the long-term acceleration score.

6. The system of claim 5, wherein the adapted acceleration value is calculated by multiplying a normalized acceleration value by the long-term acceleration score.

7. The system of claim 5, wherein the instantaneous acceleration score is calculated using a fuzzy logic algorithm.

8. The system of claim 1, wherein the forgetting factor is based on a comparison fo the instantaneous acceleration score to a function of the long-term acceleration score.

9. A method for controlling a vehicle display comprising:
   receiving, by a controller, input indicative at least of vehicle acceleration, accelerator pedal position change and powertrain output power;
   calculating, by the controller, an instantaneous acceleration score based upon the input;
   calculating, by the controller, a long-term acceleration score based upon the instantaneous acceleration score, a previous long-term acceleration score, and a forgetting factor weighting the instantaneous and previous long-term acceleration scores; and
   displaying, by an interface, an acceleration feedback gauge having an acceleration feedback indicator indicative of the long-term acceleration score.

10. The method of claim 9, further comprising:
    normalizing one or more of the vehicle acceleration, the powertrain output power and the accelerator pedal position change based upon vehicle speed prior to calculating the instantaneous acceleration score.

11. The method of claim 9, further comprising:
    calculating an adapted acceleration value prior to calculating the instantaneous acceleration score, the adapted acceleration value being based on the vehicle acceleration and the long-term acceleration score.

12. A display control system comprising:
    a controller configured to receive input indicative of an adapted vehicle acceleration value, powertrain output power and accelerator pedal position change, calculate an instantaneous acceleration score based on the input, and provide an acceleration feedback signal corresponding to a long-term acceleration score based upon the instantaneous acceleration score; and
    a display in communication with the controller and including an acceleration feedback gauge configured to display an acceleration feedback indicator indicative of the long-term acceleration score;

wherein the adapted vehicle acceleration value is based on current vehicle acceleration and a previous long-term acceleration score;

wherein the adapted vehicle acceleration value is based on current vehicle acceleration and a previous long-term acceleration score.

13. The display system of claim 12, wherein the display is further configured to adjust a color of at least a portion of the acceleration feedback gauge based on the long-term acceleration score.

* * * * *